US008898783B2

(12) United States Patent
Chung et al.

(10) Patent No.: US 8,898,783 B2
(45) Date of Patent: Nov. 25, 2014

(54) DETECTING MALICIOUS DEVICE

(75) Inventors: Jaeho Chung, Seoul (KR); Yung-Ha Ji, Gyeonggi-do (KR); Joo-Young Yoon, Seoul (KR); Kyu-Jeong Han, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 346 days.

(21) Appl. No.: 13/476,347

(22) Filed: May 21, 2012

(65) Prior Publication Data

US 2012/0304297 A1 Nov. 29, 2012

(30) Foreign Application Priority Data

May 20, 2011 (KR) .......................... 10-2011-0048136
Oct. 21, 2011 (KR) .......................... 10-2011-0108156

(51) Int. Cl.
*G06F 21/00* (2013.01)
*H04W 12/12* (2009.01)
*H04L 29/06* (2006.01)
*H04W 84/12* (2009.01)

(52) U.S. Cl.
CPC ........... *H04W 12/12* (2013.01); *H04L 63/1416* (2013.01); *H04L 63/1433* (2013.01); *H04L 63/1466* (2013.01); *H04W 84/12* (2013.01)
USPC ......................................................... 726/23

(58) Field of Classification Search
None
See application file for complete search history.

(56) References Cited

U.S. PATENT DOCUMENTS

| 7,286,515 B2 * | 10/2007 | Olson et al. .................... 370/338 |
| 8,000,698 B2 * | 8/2011 | Wolman et al. ............... 455/423 |
| 2003/0221006 A1 | 11/2003 | Kuan et al. |
| 2004/0003285 A1 * | 1/2004 | Whelan et al. ................ 713/201 |
| 2005/0213553 A1 * | 9/2005 | Wang ............................ 370/349 |
| 2006/0171388 A1 * | 8/2006 | Ikeda ............................ 370/389 |
| 2007/0183375 A1 * | 8/2007 | Tiwari ........................... 370/338 |
| 2007/0291945 A1 * | 12/2007 | Chuang et al. ................ 380/270 |

(Continued)

FOREIGN PATENT DOCUMENTS

| JP | 2007-089006 A | 4/2007 |
| JP | 2007-243345 A | 9/2007 |

(Continued)

OTHER PUBLICATIONS

Ibrahim Halil Saruhan, SANS Institute InfoSec Reading Room, "Detecting and Preventing Rouge Devices on the Network", Aug. 8, 2007.*

(Continued)

*Primary Examiner* — Peter Poltorak
(74) *Attorney, Agent, or Firm* — IP Legal Services, LLC

(57) ABSTRACT

A wireless access point and a method may be provided for detecting a malicious device in a network. The wireless access point may include a controller, a search unit, a message generation unit, and a determination unit. The controller may be configured to initiate a malicious device detection mode regularly at predefined intervals. The search unit may be configured to detect candidate devices broadcasting a signal with the first SSID from neighbor devices in an associated network. The message generation unit may be configured to generate a test message in the malicious device detection mode and transmit the test message to the candidate devices. The determination unit may be configured to determine a corresponding device in the candidate device as a malicious device when a test response message is not received from the corresponding device in response to the test message.

18 Claims, 6 Drawing Sheets

(56) References Cited

U.S. PATENT DOCUMENTS

| | | | |
|---|---|---|---|
| 2007/0298720 A1* | 12/2007 | Wolman et al. | 455/66.1 |
| 2008/0016556 A1 | 1/2008 | Selignan | |
| 2008/0072289 A1* | 3/2008 | Aoki et al. | 726/3 |
| 2008/0198826 A1 | 8/2008 | Won | |
| 2008/0250498 A1* | 10/2008 | Butti et al. | 726/23 |
| 2008/0304458 A1* | 12/2008 | Aghvami et al. | 370/338 |
| 2008/0313500 A1 | 12/2008 | Strauss et al. | |
| 2009/0137247 A1 | 5/2009 | Mok | |

FOREIGN PATENT DOCUMENTS

| | | |
|---|---|---|
| KR | 10-2004-0046006 A | 6/2004 |
| KR | 10-2004-0111457 A | 12/2004 |
| KR | 10-2008-0077859 A | 8/2008 |
| KR | 10-2009-0008302 A | 1/2009 |
| KR | 10-2009-0055150 A | 6/2009 |
| KR | 10-2010-0019517 A | 2/2010 |

OTHER PUBLICATIONS

Aruba Networks Security Assessment, Networktest, Proecte the Air: Testing Aruba Networks' RFProtect AirWave Capabilities to Detect and Repel WLAN Attacks, Jan. 2011.*

Sushama Shrirke, S.B. Vanjale, "Rouge Access Point Detection Using Time Stamp", International Journal of Advanced Computer and Mathematical Sciences ISSN 2230-9624, vol. 2, Issue 2, Jun. 2011.*

* cited by examiner

DETECTING MALICIOUS DEVICE

CROSS REFERENCE TO PRIOR APPLICATIONS

The present application claims priority under 35 U.S.C. §119 to Korean Patent Application No. 10-2011-0048136 (filed on May 20, 2011) and Korean Patent Application No. 10-2011-0108156 (filed on Oct. 21, 2011), which are hereby incorporated by reference in their entireties.

FIELD OF THE INVENTION

The present invention relates to detecting malicious devices in a wireless local area network.

BACKGROUND OF THE INVENTION

A wireless local area network (WLAN) wirelessly connects devices to a communication network through an access point. The WLAN may provide users mobility to move around within a local coverage area and still be connected to the network. WLAN has been developed based on Institute of Electrical and Electronics Engineers (IEEE) 802.11 standards and marketed under a brand name of Wi-Fi. WLAN may provide wireless connection using an industrial scientific medical (ISM) band, about a radio frequency of 2.4 GHz band. WLAN may provide networking capability similar to a wired local area network.

Lately, WLAN has become popular due to ease of installation and low maintenance cost. For example, service providers have installed a relatively large number of wireless access points and provide their subscribers connection to a communication network. Subscribers may access the wireless access points of one service provider using corresponding devices and wirelessly connect to a communication network. A wireless access point might be implemented with a device that enables user devices to wirelessly connect a wired network using at least one of WLAN, WiBro, Bluetooth or related stands. The wireless access point usually connects to a router through a wired network and relays data between the wireless devices such as a computer or a printer and wired devices on the network. The wireless access point of one service provider has a unique service set identifier (SSID). An SSID is a 32-character alphanumeric key uniquely identifying the corresponding WLAN network. The wireless access point may provide connection to devices configured with the same SSID.

Some hackers modify a device to transmit a signal with a specific SSID of a certain service provider and induce related users to access the modified device in order to illegally obtain personal information. Accordingly, there is need for detecting such a malicious device and for preventing such a device from obtaining personal information.

SUMMARY OF THE INVENTION

Embodiments of the present invention overcome the above disadvantages and other disadvantages not described above. Also, the present invention is not required to overcome the disadvantages described above, and embodiments of the present invention may not overcome any of the problems described above.

In accordance with an aspect of the present invention, an access point may detect a malicious device in a WLAN network.

In accordance with another aspect of the present invention, malicious devices may be detected by transmitting a test message to neighbor devices in a WLAN network.

In accordance with another aspect of the present invention, a device may be determined as a malicious device when a test response message is not received from the device in response to a test message.

In accordance with another aspect of the present invention, an associate request message or a probe request message may be used to detect a malicious device in a WLAN network.

In accordance with an exemplary embodiment of the present invention, a method may be provided for detecting a malicious device in a network. The method may include initiating a malicious device detection mode, transmitting a test message to neighbor devices in the network, and determining whether a test response message is received from the neighbor devices in response to the test message. Based on the determination result, the method may include determining a corresponding neighbor device transmitting the test response message in response to the test message as a non-malicious device, otherwise, determining the corresponding neighbor device as a malicious device.

The malicious device detection mode may be regularly initiated at predefined intervals.

The transmitting a test message to neighbor devices may include detecting, among the neighbor devices, candidate devices that transmit a signal with a specific service set identifier (SSID), transmitting an associate request message to the detected candidate devices, receiving an associate response message from the detected candidate devices, obtaining information on the detected candidate devices from the received associate response message, and transmitting the test message to the detected candidate devices based on the obtained information.

The obtained information may include at least one of an Internet protocol (IP) address and a multiple access control (MAC) address of the detected devices.

The method may include storing the obtained information on the detected candidate devices in a memory.

The specific SSID may be at least one of an SSID of a certain service provider, an SSID of a certain device in the related network, and an SSID of a wireless access point performing the malicious device detection mode.

The detecting candidate devices transmitting a signal with a specific service set identifier (SSID) may include scanning beacon signals transmitted from the neighbor devices, extracting an SSID from each scanned beacon signal transmitted from each one of corresponding neighbor devices, comparing the extracted SSID with the specific SSID, and determining a corresponding neighbor device as the candidate device when the extracted SSID is identical to the specific SSID based on the comparison result.

The test message may include at least one of a certain bit sequence or a certain bit pattern.

The determining whether a test response message is received from the neighbor devices in response to the test message may include receiving a message from the neighbor devices in response to the corresponding test message, determining whether the received message includes a predefined bit sequence or not, determining the received message as the test response message when the received message includes the predefined bit sequence, otherwise, determining the received message as a non-test response message.

The method may further include reporting the determined malicious device to a related server associated with the related network and blocking access of the determined malicious device from the related network.

The method may further include initiating a timer upon when the test message is transmitted to the neighbor devices and determining a neighbor device as a malicious device when receiving no message from the neighbor device until the timer expires.

In accordance with another embodiment of the present invention, a method may be provided for detecting a malicious device in a wireless local area network (WLAN) network by a wireless access point. The method may include initiating a malicious device detection mode, transmitting a test message to neighbor devices located within a service area of the wireless access point, and determining whether a test response message is received from the neighbor devices in response to the test message. Based on the determination result, the method may include determining a corresponding neighbor device transmitting the test response message as a non-malicious device, otherwise, determining the corresponding neighbor device as a malicious device.

The transmitting a test message may include detecting, among the neighbor devices, candidate devices that transmit a signal with a specific service set identifier (SSID), generating a predefined test bit sequence as the test message, including the predefined test bit sequence in an associate request message, and transmitting the associate request message to the detected candidate devices.

The detecting candidate devices may include scanning beacon signals transmitted from the neighbor devices, extracting an SSID from the scanned beacon signal transmitted from each one of the neighbor devices, comparing the extracted SSID with the specific SSID, and determining a corresponding neighbor as the candidate device when the extracted SSID is identical to the specific SSID based on the comparison result.

The determining whether a test response message is received may include determining whether the received associate response message includes a predefined response bit sequence or not, determining that the received associate response message includes the test response message when the received associate response message includes the predefined response bit sequence, and determining that the received associate response message does not include the test response message when the received message does not include the predefined response bit sequence.

The transmitting a test message may include generating a predefined bit sequence as the test message, including the predefined bit sequence in a probe request message, and broadcasting the probe request message to the neighbor devices.

The determining whether a test response message is received may include obtaining information on the neighbor devices, determining whether a neighbor device is configured with a specific SSID based on the obtained information, determining the neighbor device as a non-malicious device when the neighbor device is not configured with the specific SSID, otherwise, making determination as to whether the received probe response message includes a test response message.

The determination as to whether the received probe response message includes a test response message may includes determining whether the received probe response message includes a predefined response bit sequence or not, determining that the received probe response message includes the test response message when the received probe response message includes the predefined response bit sequence, and determining that the received probe response message does not include the test response message when the received message does not include the predefined response bit sequence.

The method may further include reporting the determined malicious device to a related server associated with the WLAN network and blocking the determined malicious device from access to the WLAN network.

In accordance with another embodiment of the present invention, a wireless access point may include a controller, a search unit, a message generation unit, a determination unit, and a notification unit. The controller may be configured to initiate a malicious device detection mode regularly at predefined intervals. The search unit may be configured to detect candidate devices broadcasting a signal with the first SSID from neighbor devices in an associated network. The message generation unit may be configured to generate a test message in the malicious device detection mode and transmit the test message to the candidate devices. The determination unit may be configured to determine a corresponding device in the candidate device as a malicious device when a test response message is not received from the corresponding device in response to the test message. The notification unit may be configured to notify the determined malicious device to a related server so as to block the determined malicious device from access to the associated network.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
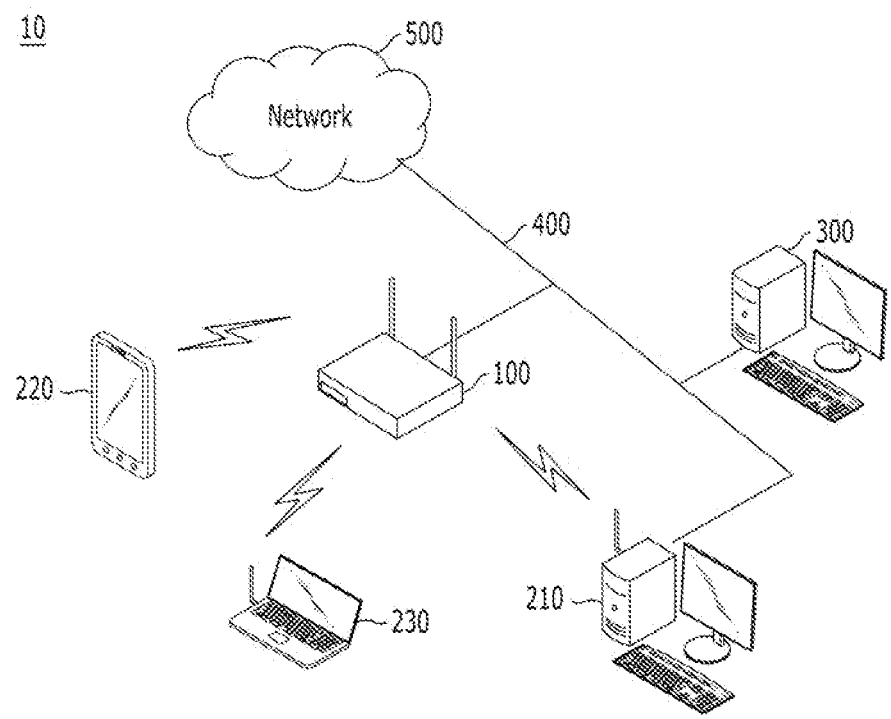
FIG. 1 shows a wireless local area network (WLAN) network operating in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with embodiments of the present invention, a wireless access point may detect a malicious device in a wireless local area network (WLAN) network. In order to detect the malicious device, the wireless access point may transmit a test message to neighbor devices in a WLAN network. When the wireless access point does not receive a predefined test message response from the neighbor devices, the wireless access point may determine a corresponding device without the predefined test message response as a malicious device and report the malicious device to a related server, such as a network management system, in accordance with embodiments of the present invention.

FIG. 1 shows a wireless local area network (WLAN) network operating in accordance with embodiments of the present invention.

Referring to FIG. 1, WLAN network 10 may include wireless access point 100 and devices 210, 220, and 230. Wireless access point 100 may be connected to network 500 through wired network 400. Wireless access point 100 may be directly connected to wired network 400 or indirectly connected to wired network 400. For example, wireless access point 100 may be connected to a wired LAN device such as a router (not shown) connected to wired network 400. Wireless access point 100 may be a Wi-Fi access point. Wireless access point 100 may connect devices 210, 220, and 230 to network 500. Wireless access point 100 may communicate with network management system 300 through wired network 400.

In accordance with embodiments of the present invention, devices 210, 220, and 230 may denote any wireless devices located within a service range of wireless access point 100 and access wireless access point 100, but the present invention is not limited thereto. In accordance with embodiments of the present invention, a device may denote various wireless devices capable of transmitting a signal with a specific SSID. For example, the device may include a wireless access point, a stationary access point, a smart phone, a tablet PC, and a laptop PC, or any such device comprising a wireless radio/modem module.

For convenience and ease of understanding device 210 is defined as a malicious wireless device, hereinafter. The malicious wireless device, device 210, may maliciously transmit a signal with a specific SSID without authorization. For example, the malicious wireless device may transmit a signal with an SSID identical to that of wireless access point 100. The malicious wireless device may also be referred to as an unauthorized device. That is, a hacker may duplicate a SSID of wireless access point 100 without authorization and configure device 210 with the duplicated SSID for a malicious purpose. Accordingly, device 210 may transmit a signal with the SSID identical to that of wireless access point 100 and neighbor devices 220 and 230 may access device 210 without knowing that device 210 is the unauthorized and malicious device.

Furthermore, device 220 may be assumed as an authorized device that transmits the same SSID of wireless access point 100. Device 230 may be assumed as a device transmitting other SSID. Accordingly, devices 220 and 230 may be non-malicious devices.

As described above, wireless access point 100 may detect a malicious device in WLAN network 10 in accordance with embodiments of the present invention. Hereinafter, a wireless access point capable of detecting a malicious device in a WLAN network in accordance with embodiments of the present invention will be described with reference to FIG. 2.

Figure 2:
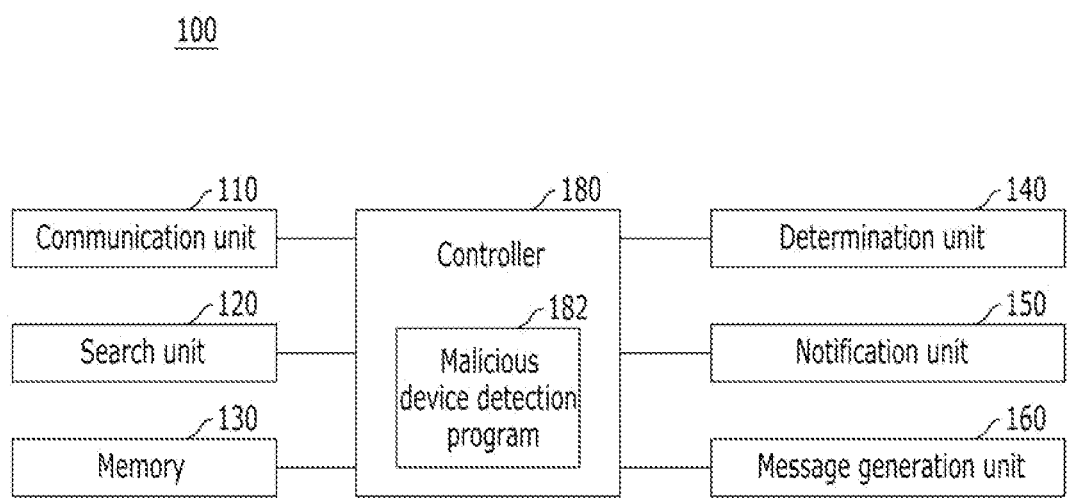
FIG. 2 shows a wireless access point capable of detecting a malicious device in a WLAN network in accordance with embodiments of the present invention.

FIG. 2 shows a wireless access point capable of detecting a malicious device in a WLAN network in accordance with embodiments of the present invention.

Referring to FIG. 2, wireless access point 100 may include communication unit 110, search unit 120, memory 130, determination unit 140, notification unit 150, message generation unit 160, and controller 180. Controller 180 may include malicious device detection program 182. Malicious device detection program 182 may be a software program installed in wireless access point 100.

Communication unit 110 may communicate with neighbor devices in WLAN network 10. For example, communication unit 110 may communicate with devices located within a service area of wireless access point 100. As shown in FIG. 1, communication unit 110 may communicate with devices 210, 220, and 230. Furthermore, communication unit 110 may communicate with network management system 300 through wired network 400.

Particularly, communication unit 110 may transmit and receive various messages to detect a malicious device in response to controller 180. For example, communication unit 110 may transmit and receive an associate request message and an associate response message, transmit and receive a test message and a test response message, and broadcast and receive a probe request message and a probe response message.

Controller 180 may control constituent elements of wireless access point 110 in overall. In accordance with an embodiment of the present invention, controller 180 regularly initiate a malicious device detection mode at a given interval in order to detect a malicious device located in WLAN network 10. For example, controller 180 may execute malicious device detection program 182 to initiate the malicious device detection mode. Malicious device detection program 182 may be a software program that controls and manages constituent elements of wireless access point 100 for performing the malicious device detection mode. Particularly, controller 180 may control constituent elements of wireless access point 180 according to malicious device detection program 182 to detect a malicious device in WLAN network 10.

Search unit 120 may search for devices transmitting a signal with a specific SSID, for example, an SSID identical that of wireless access point 100 in a malicious device detection mode. When search unit 120 detects at least one device transmitting the specific SSID in WLAN network 10, search unit 120 may report the detected device to controller 180. Controller 180 may control communication unit 110 to transmit a test message to the detected device in a malicious device detection mode. Such a malicious device detection mode may be initiated regularly at a given interval. In order to detect devices transmitting the specific SSID, search unit 120 may scan beacon signals transmitted from neighbor devices and extract a SSID included in the scanned beacon signal. Search unit 120 may compare the extracted SSID with the specific SSID and transmit the search result to controller 180. Furthermore, search unit 120 may analyze probe response messages received from neighbor devices in response to a probe request message. That is, search unit 120 may extract an SSID configured with a corresponding neighbor device from the received probe response message.

Message generation unit 160 may generate a test message according to malicious device detection program 182 under the control of controller 180 in the malicious device detection mode. The test message may include a predefined test bit sequence. After detecting the neighbor devices configured with a specific SSID, the generated test message may be transmitted to the detected neighbor devices. The test message may include a predetermined test bit sequence. The predefined test bit sequence may be consecutive bit sequence or bit patterns. For example, the predefined test bit sequence may be a bit sequence of 01010101, but the present invention is not limited thereto. Such a test message may have various forms.

Message generation unit 160 may generate a test response message according to malicious device detection program 182 under the control of controller 180. For example, when wireless access point 110 receives the test message from other device, message generation unit 160 may generate the test response message in response to the test message. The test response message may include a predefined response bit sequence. Such a predefined response bit sequence may be generated by adding a certain value, for example, at least one bit, to the predefined test bit sequence, but the present invention is not limited thereto. Such a predefined response bit sequence may be generated through various methods.

Determination unit 140 may whether a test response message is received from a neighbor device in response to the test message. Based on the determination result, determination unit 140 may determine whether the device is a malicious device or not. For example, when wireless access point 100 receive a message after transmitting the test message, determination unit 140 may determine whether the received message is a test response message or not. When the test response message includes a predefined response bit sequence, determination unit 140 may determine that the received message is the test response message. Based on the determination result, determination unit 140 may determine a device transmitting the test response message as a non-malicious device. Furthermore, determination unit 140 may determine a device not transmitting the test response message as a malicious device. Determination unit 140 may transmit the determination result to notification unit 150.

When determination unit 140 determines that the device is the malicious device, notification unit 150 may report information on the detected device to network management system 300. The information on the detected WLAN device may include an IP address and/or a MAC address. Accordingly, network management system 300 may block the detected device from accessing WLAN network 10 or warn the detected device to reconfigure with a different SSID, based on the report result.

Memory 130 may store information on the detected device, for example, a device transmitting the specific SSID. The specific SSID may be an SSID identical to that of wireless access point 100. As described above, information on the detected device may include an IP address or/and a MAC address of the detected device.

Hereinafter, a method for detecting a malicious device in a WLAN network in accordance with embodiments of the present invention will be described with reference to FIG. 3. For convenience and ease of understanding, embodiments of the present invention will be described as that a wireless access point may perform such a malicious device detection mode to detect a malicious device in a WLAN network. The present invention, however, is not limited thereto. Instead of the wireless access point, any device capable of accessing an associated WLAN network and including a malicious device detection program may perform the malicious device detection mode in accordance with another embodiment of the present invention. Furthermore, such device may detect a malicious device in other communication networks including a wireless broadband (WiBro) network through the malicious device detection mode in accordance with another embodiment of the present invention.

Figure 3A:
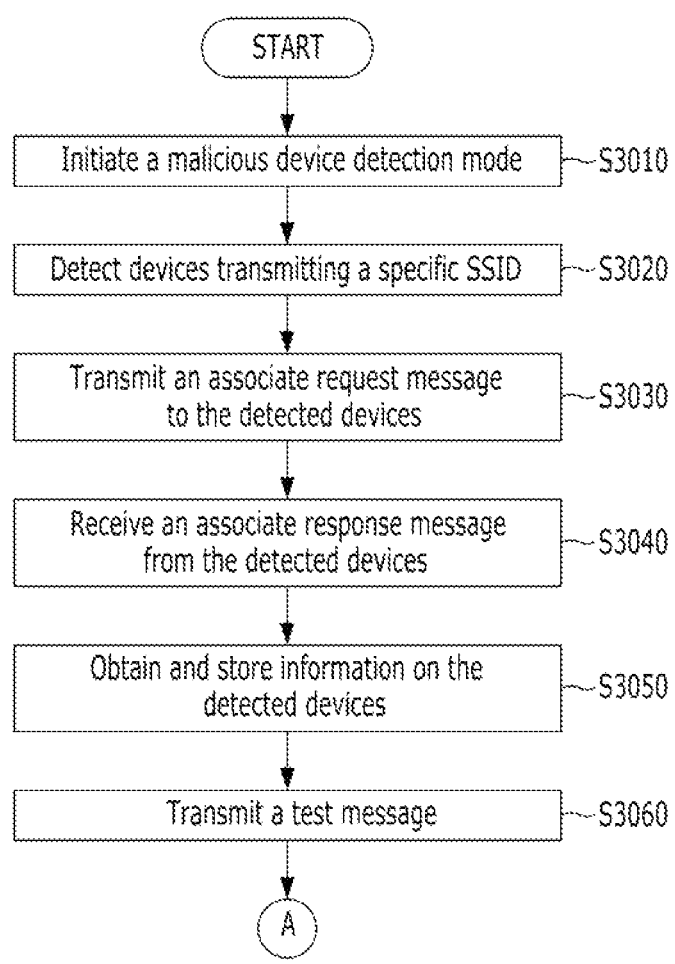
FIGS. 3A and 3B show a method for detecting a malicious device in a WLAN network in accordance with embodiments of the present invention.
Figure 3B:
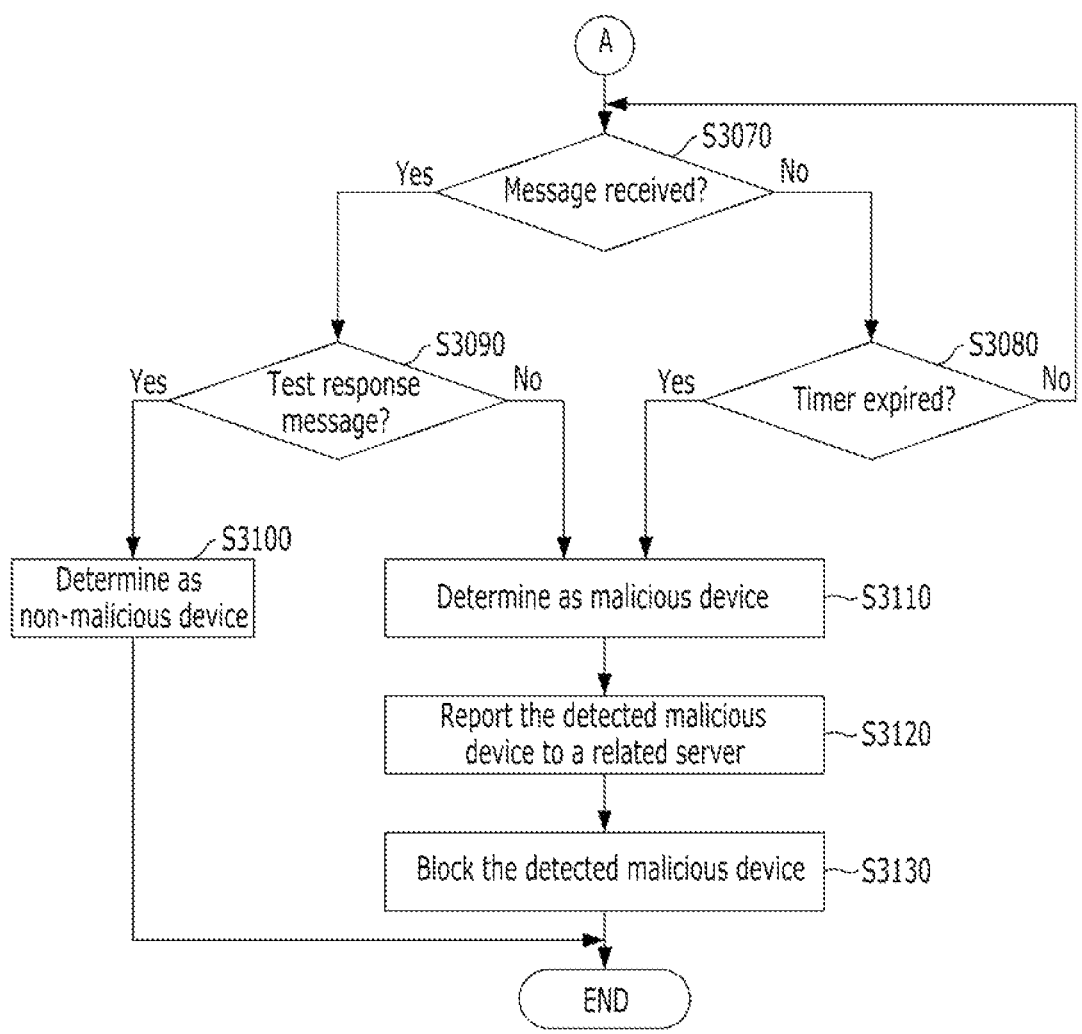

FIGS. 3A and 3B show a method for detecting a malicious device in a WLAN network in accordance with embodiments of the present invention.

Referring to FIGS. 3A and 3B, a malicious device detection mode may be initiated at step S3010. While providing a related service, access point 100 may initiate a malicious device detection mode in accordance with embodiments of the present invention. The malicious device detection mode may be a mode for detecting malicious devices in an associated WLAN network. As described above, the malicious device may be a device that may broadcast a signal with a specific SSID without authorization. Typically, a wireless access point may provide a related service only to devices configured with an SSID identical to that of the wireless access point. That is, devices in a WLAN network may search for a wireless access point broadcasting the same SSID in order to access a WLAN network. The malicious device may be a wireless device that maliciously duplicates a specific SSID and broadcasts a signal with the duplicated SSID for a malicious purpose. The malicious device may induce other devices to be accessed and illegally obtain personal information from the devices for malicious purpose. In this manner, personal information may be illegally obtained from random users. The specific SSID may be an SSID assigned to a certain service provider or a certain device included in the associated WLAN network. For example, the specific SSID is an SSID identical to that of wireless access point 110. The malicious device detection mode may be initiated by a malicious device detection program installed at wireless access point 100. Such a malicious device detection mode may be regularly initiated at a given interval. Alternatively, the malicious device detection mode may be initiated in response to a signal from other device. For example, wireless access point 100 may initiate the malicious device detection mode in response to an initiation signal received from a related server such as network management system 300, but the present invention is not limited thereto.

At step S3020, devices that transmit a signal with a specific SSID may be detected. For example, in the malicious device detection mode, wireless access point 100 may detect neighbor devices that transmit a signal with the specific SSID. As described above, the specific SSID may be a SSID of wireless access point 100. The neighbor device may denote devices located within a service area of wireless access point 100, but the present invention is not limited thereto. In order to detect neighbor devices transmitting the specific SSID, wireless access point 100 may detect a beacon signal transmitted from neighbor devices and extract a SSID included in the detected beacon signal. Wireless access point 100 may compare the extracted SSID with the specific SSID. Such operation may be performed by search unit 120 of wireless access point 100 in accordance with embodiments of the present invention.

For another example, search unit 120 of wireless access point 100 may broadcast a probe request message to neighbor devices through communication unit 110. In response to the probe request message, wireless access point 100 may receive probe response messages from the neighbor devices. Search unit 120 of wireless access point 100 may analyze the received probe response messages whether the received probe response messages include the specific SSID.

At step S3030, an associate request message may be transmitted to the detected devices. For example, wireless access point 100 may transmit an associate request message to the detected devices transmitting a signal with the specific SSID, for example, the same SSID identical of wireless access point 100.

At step S3040, an associate response message may be received in response to the associate request message. For example, wireless access point 100 may receive an associate response message in response to the associate request message. The associated response message may include information on a device transmitting the associate response message. Such information may include an Internet protocol (IP) address and/or multiple access control (MAC) address of the device.

At step S3050, information on the detected devices may be obtained and stored. For example, wireless access point 100 may obtain the information on the detected devices, such as IP addresses and/or the MAC addresses of the detected devices.

Such obtained information may be stored in memory 130. The present invention, however, is not limited thereto. After determining malicious devices, wireless access point 100 may store only information on the determined malicious devices instead of storing all the detected devices that transmit the specific SSID.

At step S3060, a test message may be transmitted to the detected devices. For example, upon the receipt of the associate response message, wireless access point 100 may transmit a test message to the detected devices based on the obtained information such as IP addresses and/or MAC addresses of the detected devices. The test massage may be generated by message generation unit 160 in response to control of malicious device detection program 182. For example, the test massage may contain the certain number of consecutive bits or bit patterns, such as a predefined test bit sequence. The test message may have a bit sequence of 0s and 1s, for example, 10101010. Such a test message may be predefined to detect a malicious device by a system designer or a service provider. Furthermore, a timer may be initiated upon the transmission of the test message at step S3060.

At step S3070, a determination may be made as to whether a message is received in response to the test message. For example, such a received message may be a test response message. The test response message may include a predefined test bit sequence predefined by a system designer or a service provider in order to detect a malicious device in accordance with embodiments of the present invention. Message generation unit 160 may generate such a predefined test bit sequence by adding at least one predefined bit to the test message in accordance with embodiments of the present invention. Such a generation scheme of a test message and a test response message may be predefined by a system design or a service provider and the generation scheme may be included in malicious device detection program 182 in accordance with embodiments of the present invention. However, the present invention is not limited thereto. The test message and the test response message may be generated in various manners.

When a message is not received (No—S3070), determination may be made as to whether the timer is expired at step S3080. When the timer is not expired (No—S3080), determination may be made again as to whether a message is received at step S3070. For example, such a determination may be made at a certain interval that is shorter than the time period of the timer. The present invention, however, is not limited thereto. Alternatively, the test packet may be transmitted again in accordance with another embodiment of the present invention. Such retransmission might be because the test message and/or the test response message may be lost due to adverse network conditions.

When the timer is expired without receiving a message (Yes—S3080), the detected devices may be determined as a malicious device at step S3110. For example, determination unit 140 of wireless access point 100 may determine the detected devices as malicious devices when the test response message is not received from the detected devices in response to the test message.

When a message is received (Yes—S3070), a determination may be made as to whether the received message is the test response message at step S3090. For example, determination unit 140 of wireless access point 100 may determine whether the received message include a predefined response bit sequence.

When the received message include the predefined response bit sequence (Yes—S3090), a corresponding device may be determined as a non-malicious device at step S3100. Furthermore, when the received message does not include the predefined response bit sequence (No—S3090), a corresponding device may be determined as a malicious device at step S3110.

At step S3120, the malicious device may be reported to a related server. For example, notification unit 150 of wireless access point 100 may report the detected malicious device to network management system 300. At step S3130, the malicious device may be blocked from accessing a related WLAN network. For example, network management system 300 may block the malicious device from accessing WLAN network 10. The present invention, however, is not limited thereto. Alternatively, network management system 300 may warn the malicious device not to access WLAN network 10 or to reconfigure a SSID.

As described above, wireless access point 100 may detect malicious devices in a related WLAN network by exchanging the test message and the test response message in accordance with embodiments of the present invention. In accordance with embodiments of the present invention, non-malicious devices configured with the same SSID in a related WLAN network may be agreed to exchange the test message and the test response message. Accordingly, such device may have the similar configuration of wireless access point 100 and include malicious device detection program 182 installed therein. The device may generate and transmit the test response message upon the receipt of the test message from wireless access point 100. Furthermore, wireless access point 100 may become an object to be determined as a malicious device when other non-malicious device in the same WLAN network performs the malicious device detection mode in accordance with embodiments of the present invention. In this case, wireless access point 100 may receive the test message, generate the test response message in response to the test message, and transmit the test response message to a device transmitting the test message. Such an operation will be described with reference to FIG. 4.

Figure 4:
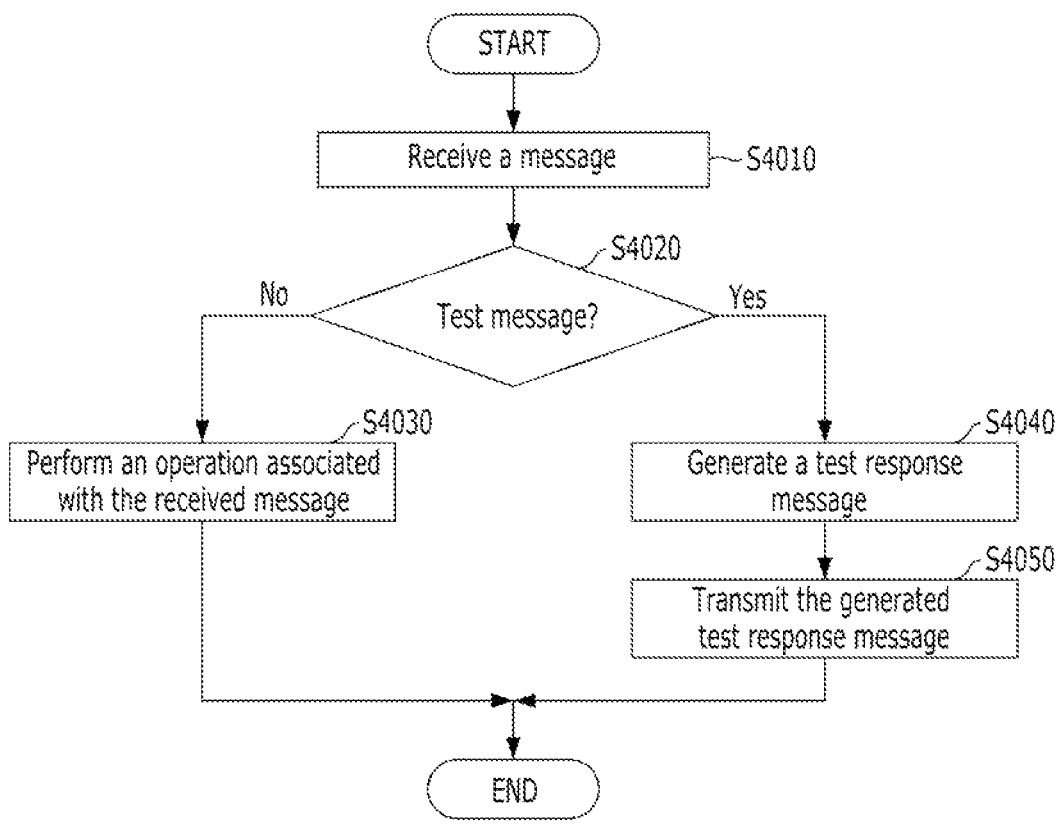
FIG. 4 shows a method for responding a test message in accordance with embodiments of the present invention.

FIG. 4 shows a method for responding a test message of a malicious device detection mode in accordance with embodiments of the present invention.

Referring to FIG. 4, a message may be received at step S4010. For convenience and ease of understanding, wireless device 220 (see FIG. 1) is defined as a non-malicious device. In this case, wireless devices 220 may receive the message from wireless access point 100.

At step S4020, determination may be made as to whether the received message is a test message or not. For example, wireless device 220 may determine whether the received message includes a predefined test bit sequence indicating the test message.

When the received message is not a test message (No—S4020), an operation associated with the received message may be performed at step S4030. For example, wireless device 220 may determine that the received message is not the test message when the received message does not include the predefined test bit sequence indicating the test message.

When the received message is the test message (Yes—S4040), a test response message may be generated at step S4050. For example, wireless device 220 may determine that the received message is the test message when the received message includes the predefined test bit sequence indicating the test message. Such a test message may be transmitted independently from wireless access point 100, but the present invention is not limited thereto. The test message may be included in an associate request message and/or a probe request message. Then, wireless device 220 may generate a test response message including a predefined bit sequence.

Particularly, wireless device 220 may add a predetermined bit sequence to the bit sequence of the test message to generate the test response message.

The generated test response message may be transmitted at step S4060. For example, wireless device 220 may transmit the generated test response message to wireless access point 100. The generated test response message may be transmitted as an independent message, but the present invention is not limited thereto. The generated test response message may be included in an associate response message and/or a probe response message. After wireless access point 100 receives the test response message, wireless access point 100 may determine wireless device 220 as non-malicious device. In case of a malicious device, the malicious device may not recognize the test message so the malicious device may not create or transmit the test response message. Although the malicious device may recognize the test message, the malicious device does not know how to create the test response message. Accordingly, the malicious device cannot create and transmit the test response message.

As described above, wireless access point 100 may exchange the test message and the test response message in accordance with embodiments of the present invention. The present invention, however, is not limited thereto. Wireless access point 100 may include such test message and test response message in existing messages such as an associate request message, an associate response message, a probe request message, and a probe response message. Such operation will be described with reference to FIG. 5 and FIG. 6.

Figure 5:
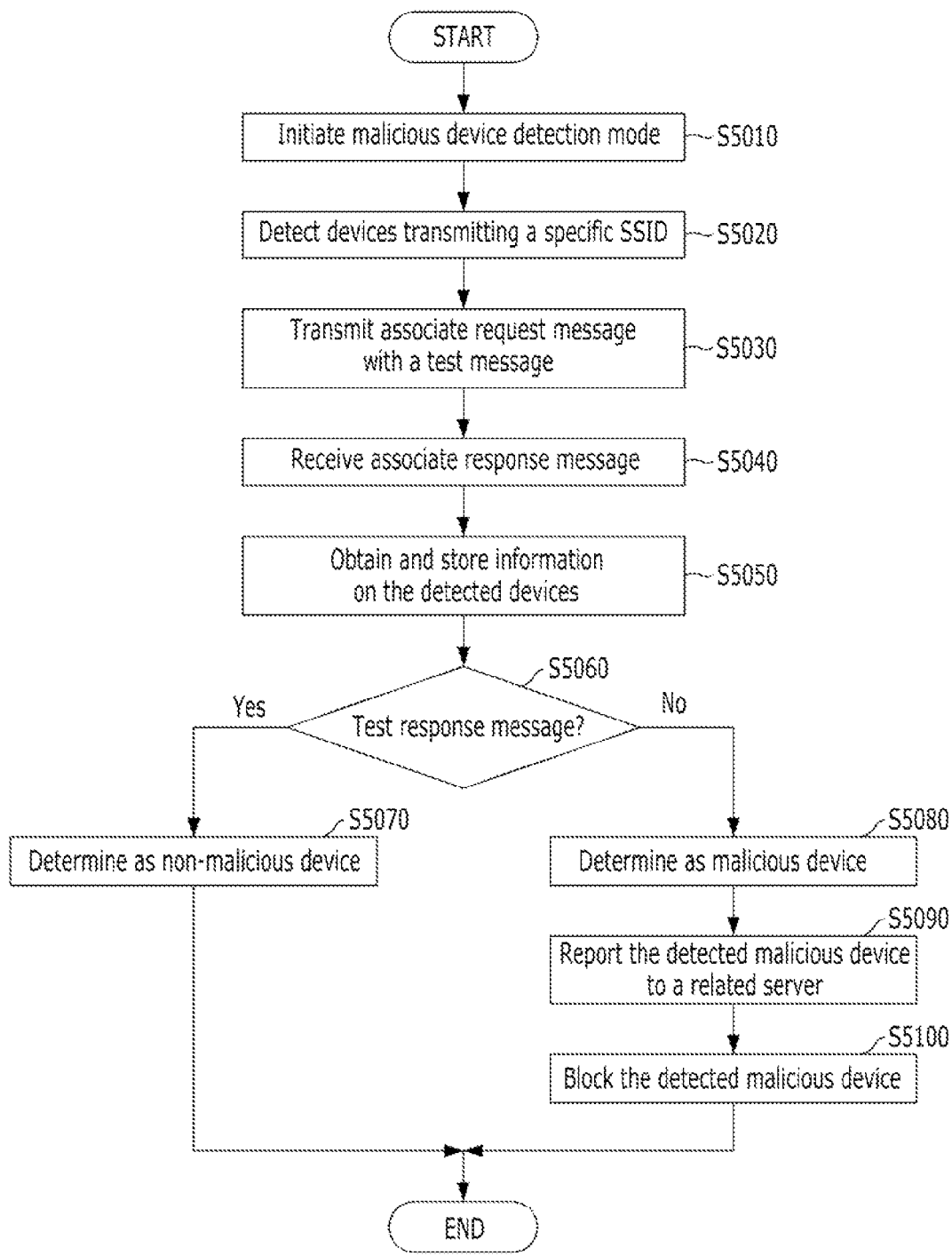
FIG. 5 shows a method for detecting a malicious device using an associate request message in a WLAN network in accordance with embodiments of the present invention.

FIG. 5 shows a method for detecting a malicious device using an associate request message in a WLAN network in accordance with embodiments of the present invention.

Referring to FIG. 5, a malicious device detection mode may be initiated at step S5010. While providing a related service, access point 100 may initiate a malicious device detection mode in accordance with embodiments of the present invention. The malicious device detection mode may be initiated by a malicious device detection program installed at wireless access point 100. Such a malicious device detection mode may be regularly initiated at a given interval. Alternatively, the malicious device detection mode may be initiated in response to a signal from other device.

At step S5020, neighbor devices transmitting a signal with a specific SSID may be detected. For example, in the malicious device detection mode, wireless access point 100 may detect neighbor devices that transmit a signal with the specific SSID. As described above, the specific SSID may be a SSID of wireless access point 100. In order to detect neighbor devices transmitting the specific SSID, wireless access point 100 may detect a beacon signal transmitted from neighbor devices and extract a SSID included in the detected beacon signal. For another example, search unit 120 of wireless access point 100 may broadcast a probe request message to neighbor devices, receive probe response messages from the neighbor devices, and analyze the received probe response messages whether the received probe response messages include the specific SSID.

At step S5030, an associate request message with a test message may be transmitted to the detected devices. For example, controller 180 of wireless access point 100 may create a test message, include the created test message in the associate request message, and transmit the associate request message to the detected devices through communication unit 110. As described above, the test message may be a predefined test bit sequence, which is defined to indicate the test message.

At step S5040, an associate response message may be received. For example, wireless access point 100 may receive the associate response message in response to the associate request message. Such associate response message may include a test response message. Furthermore, the associated response message may include information on a device transmitting the associate response message. Such information may include an Internet protocol (IP) address and/or multiple access control (MAC) address of the device.

At step S5050, information on the detected device may be obtained and stored. For example, wireless access point 100 may obtain the information on the detected devices, such as IP addresses and/or the MAC addresses of the detected devices. Such obtained information may be stored in memory 130.

At step S5060, determination may be made as to whether the received associate response message includes a test response message. For example, determination unit 160 of wireless access point 100 may determine whether the received associate response message includes a test response message or not. As describe above, the test response message may be a predefined response bit sequence, which is defined by a system designer or a service provider in order to detect a malicious device in accordance with embodiments of the present invention. Message generation unit 160 may generate such a predefined response bit sequence by adding at least one predefined bit to the bit sequence of the test message in accordance with embodiments of the present invention.

When the received associate response message includes the test response message (Yes—S5060), a corresponding device may be determined as a non-malicious device at step S5070. For example, determination unit 140 of wireless access point 100 may determine the corresponding device as the non-malicious device when the received associate response message includes the test response message.

When the received message does not include the test response message (No—S5060), a corresponding device may be determined as a malicious device at step S5080. For example, determination unit 140 of wireless access point 100 may determine the corresponding device as the malicious device when the received associate response message does not include the test response message.

The detected malicious device may be reported to a related server at step S5090. For example, notification unit 150 of wireless access point 100 may report the detected malicious device to network management system 300.

At step S5100, the malicious device may be blocked from accessing a related WLAN network. For example, network management system 300 may block the malicious device from accessing WLAN network 10. The present invention, however, is not limited thereto. Alternatively, network management system 300 may warn the malicious device not to access WLAN network 10 or to reconfigure a SSID.

Figure 6:
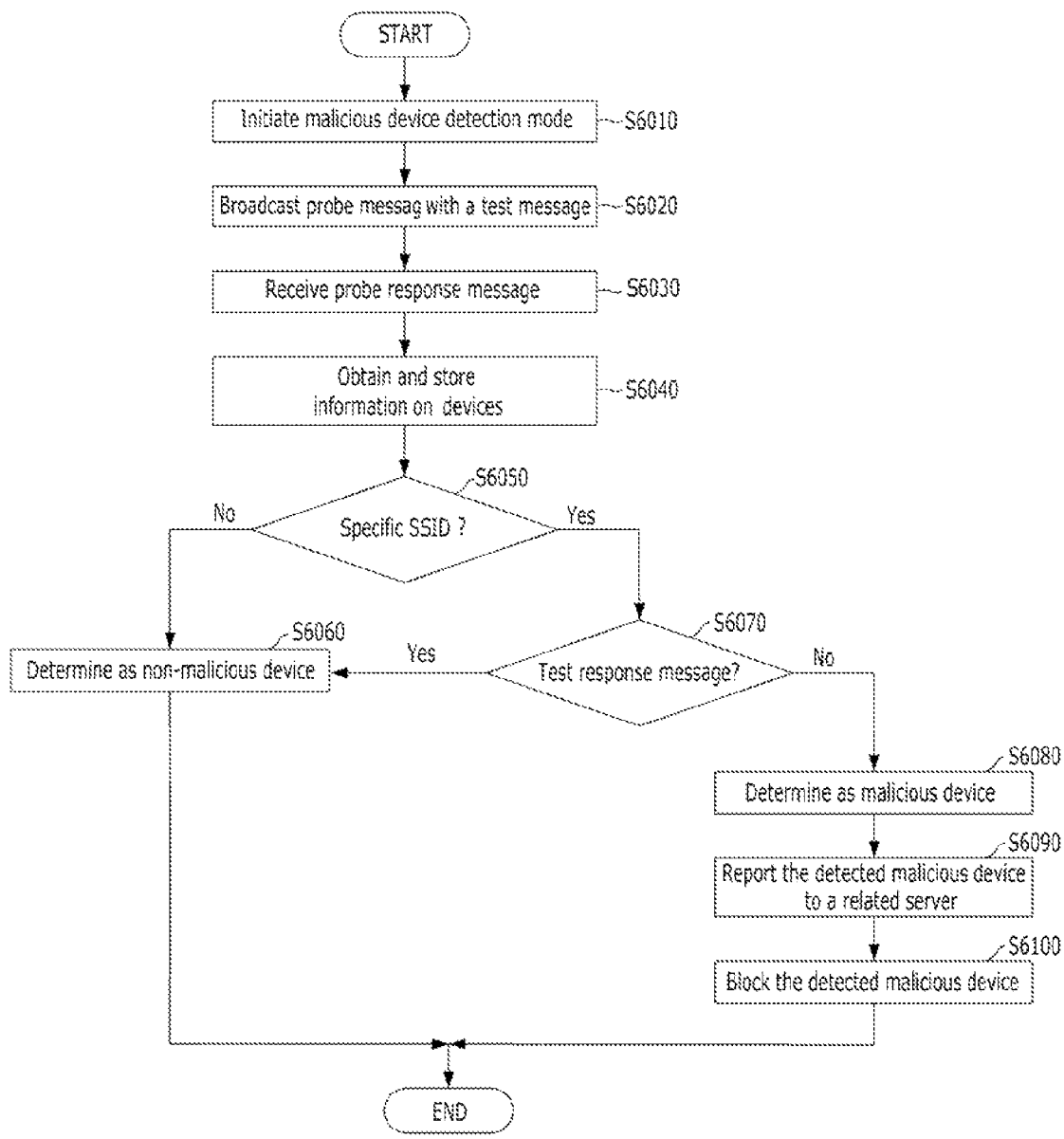
FIG. 6 shows a method for detecting a malicious device using a probe request message in a WLAN network in accordance with embodiments of the present invention.

FIG. 6 shows a method for detecting a malicious device using a probe request message in a WLAN network in accordance with embodiments of the present invention.

Referring to FIG. 6, a malicious device detection mode may be initiated at step S6010. While providing a related service, access point 100 may initiate a malicious device detection mode in accordance with embodiments of the present invention. The malicious device detection mode may be initiated by a malicious device detection program installed at wireless access point 100. Such a malicious device detection mode may be regularly initiated at a given interval. Alternatively, the malicious device detection mode may be initiated in response to a signal from other device.

At step S6020, a probe request message with a test message may be broadcast to devices in a related WLAN network. For example, controller 180 of wireless access point 100 may create a test message, include the created test message in the probe request message, and broadcast the probe request message simultaneously to all devices in WLAN network 10 through communication unit 110. Unlike the associate request message individually transmitted to each device transmitting a signal with the specific SSID, the probe request message may be broadcast to all devices, simultaneously. Furthermore, wireless access point 100 may not need to detect neighbor devices transmitting a specific SSID because the probe request message is broadcast in WLAN network 10. As described above, the test message may be a predefined bit sequence predefined to indicate the test message.

At step S6030, a probe response message may be received. For example, wireless access point 100 may receive the probe response message in response to the probe request message. Such probe response message may include information on a device transmitting the probe response message and a test response message. The information on a device transmitting the probe response message may include an associated SSID, an IP address, and/or a MAC address of the device.

At step S6040, information on the detected device may be obtained and stored. For example, wireless access point 100 may obtain the information on the devices transmitting the probe response message, such as the associated SSID, an IP address and/or a MAC address. The obtained information may be stored in memory 130.

At step S6050, determination may be made as to whether a SSID associated with the device transmitting the received probe response message is identical to a specific SSID. As described above, the specific SSID may be an SSID of wireless access point 100. For example, search unit 120 of wireless access point 100 may determine whether the SSID configured with the device transmitting the received probe response message is identical to the specific SSID.

When the SSID of the device is not identical to the specific SSID (No—S6050), the device may be determined as a non-malicious device at step S6060. When the SSID of the device is identical to the specific SSID (Yes—S6050), determination may be made as to whether the probe response message includes the test response message at step S6070. For example, determination unit 160 of wireless access point 100 may determine whether the received probe response message includes a test response message or not. As describe above, the test response message may be a certain bit sequence predefined by a system designer or a service provider in order to detect a malicious device in accordance with embodiments of the present invention. Message generation unit 160 may generate such a certain bit sequence by adding at least one predefined bit to the bit sequence of the test message in accordance with embodiments of the present invention.

When the received probe response message includes the test response message (Yes—S6070), a corresponding device may be determined as a non-malicious device at step S6060. For example, determination unit 140 of wireless access point 100 may determine the corresponding device as the non-malicious device when the received probe response message does not include the test response message and when the device transmitting the probe response message is configured with a different SSID.

When the received probe response message does not include the test response message (No—S6070), a corresponding device may be determined as a malicious device at step S6080. For example, determination unit 140 of wireless access point 100 may determine the corresponding device as the malicious device when the received probe response message does not include the test response message.

The detected malicious device may be reported to a related server at step S6090. For example, notification unit 150 of wireless access point 100 may report the detected malicious device to network management system 300.

At step S6100, the malicious device may be blocked from accessing a related WLAN network. For example, network management system 300 may block the malicious device from accessing WLAN network 10. The present invention, however, is not limited thereto. Alternatively, network management system 300 may warn the malicious device not to access WLAN network 10 or to reconfigure a SSID.

Reference herein to "one embodiment" or "embodiments" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for detecting a malicious device in a network, the method comprising:
    initiating a malicious device detection mode; transmitting a test message to neighbor devices in the network; determining whether a test response message is received from the neighbor devices in response to the test message; and
    if so, determining a corresponding neighbor device transmitting the test response message in response to the test message as a non-malicious device;
    otherwise, determining the corresponding neighbor device as a malicious device,
    wherein the transmitting a test message to neighbor devices includes:
        detecting, among the neighbor devices, candidate devices that transmit a signal with a specific service set identifier (SSID);
        transmitting an associate request message to the detected candidate devices;
        receiving an associate response message from the detected candidate devices;
        obtaining information on the detected candidate devices from the received associate response message; and
        transmitting the test message to the detected candidate devices based on the obtained information.

2. The method of claim 1, wherein the malicious device detection mode is regularly initiated at predefined intervals.

3. The method of claim 1, wherein the obtained information include at least one of an Internet protocol (IP) address and a multiple access control (MAC) address of the detected devices.

4. The method of claim 1, comprising storing the obtained information on the detected candidate devices in a memory.

5. The method of claim 1, wherein the specific SSID is at least one of an SSID of a certain service provider, an SSID of a certain device in the related network, and an SSID of a wireless access point performing the malicious device detection mode.

6. The method of claim 1, wherein the detecting candidate devices transmitting a signal with a specific service set identifier (SSID) includes:
    scanning beacon signals transmitted from the neighbor devices;
    extracting an SSID from each scanned beacon signal transmitted from each one of corresponding neighbor devices;
    comparing the extracted SSID with the specific SSID; and
    determining a corresponding neighbor device as the candidate device when the extracted
    SSID is identical to the specific SSID based on the comparison result.

7. The method of claim 1, wherein the test message includes at least one of a certain bit sequence or a certain bit pattern.

8. The method of claim 1, wherein the determining whether a test response message is received from the neighbor devices in response to the test message includes:
    receiving a message from the neighbor devices in response to the corresponding test message;
    determining whether the received message includes a predefined bit sequence or not; and
    determining the received message as the test response message when the received message includes the predefined bit sequence; otherwise, determining the received message as a non-test response message.

9. The method of claim 1, further comprising: reporting the determined malicious device to a related server associated with the related network; blocking access of the determined malicious device from the related network.

10. The method of claim 1, further comprising: initiating a timer upon when the test message is transmitted to the neighbor devices; and determining a neighbor device as a malicious device when receiving no message from the neighbor device until the timer expires.

11. A method for detecting a malicious device in a wireless local area network (WLAN) network by a wireless access point, the method comprising:
    initiating a malicious device detection mode;
    transmitting a test message to neighbor devices located within a service area of the wireless access point;
    determining whether a test response message is received from the neighbor devices in response to the test message; and
    if so, determining a corresponding neighbor device transmitting the test response message as a non-malicious device;
    otherwise, determining the corresponding neighbor device as a malicious device, wherein the transmitting a test message includes:
  detecting, among the neighbor devices, candidate devices that transmit a signal with a specific service set identifier (SSID);
  generating a predefined test bit sequence as the test message; including the predefined test bit sequence in an associate request message; and
  transmitting the associate request message to the detected candidate devices.

12. The method of claim 11, wherein the detecting candidate devices includes:
  scanning beacon signals transmitted from the neighbor devices;
  extracting an SSID from the scanned beacon signal transmitted from each one of the neighbor devices;
  comparing the extracted SSID with the specific SSID; and
  determining a corresponding neighbor as the candidate device when the extracted SSID is identical to the specific SSID based on the comparison result.

13. The method of claim 11, wherein the determining whether a test response message is received includes: determining whether the received associate response message includes a predefined response bit sequence or not;
  determining that the received associate response message includes the test response message when the received associate response message includes the predefined response bit sequence; and
  determining that the received associate response message does not include the test response message when the received message does not include the predefined response bit sequence.

14. The method of claim 11, wherein the transmitting a test message includes: generating a predefined bit sequence as the test message; including the predefined bit sequence in a probe request message; and broadcasting the probe request message to the neighbor devices.

15. The method of claim 11, wherein the determining whether a test response Message is received includes:
  obtaining information on the neighbor devices;
  determining whether a neighbor device is configured with a specific SSID based on the obtained information; and
  determining the neighbor device as a non-malicious device when the neighbor device is not configured with the specific SSID; otherwise, making determination as to whether the received probe response message includes a test response message.

16. The method of claim 15, wherein the determination as to whether the received probe response message includes a test response message includes:
  determining whether the received probe response message includes a predefined response bit sequence or not;
  determining that the received probe response message includes the test response message when the received probe response message includes the predefined response bit sequence; and
  determining that the received probe response message does not include the test response message when the received message does not include the predefined response bit sequence.

17. The method of claim 11, further comprising:
  reporting the determined malicious device to a related server associated with the WLAN network; and
  blocking the determined malicious device from access to the WLAN network.

18. A wireless access point comprising: a controller configured to initiate a malicious device detection mode regularly at predefined intervals; a search unit configured to detect candidate devices broadcasting a signal with a first specific service set identifier (SSID) from neighbor devices in an associated network;
  a message generation unit configured to generate a predetermined test bit sequence as a test message in the malicious device detection mode, include the predetermined test bit sequence in an associated request message, and transmit the associated request message as the test message to the detected candidate devices;
  a determination unit configured to determine a corresponding device in the candidate device as a malicious device when a test response message is not received from the corresponding device in response to the test message; and
  a notification unit configured to notify the determined malicious device to a related server so as to block the determined malicious device from access to the associated network.

* * * * *